April 14, 1925.
A. D. BRIXEY
1,533,374
PROJECTED LIGHT PICTURE SCREEN
Original Filed Aug. 27, 1920
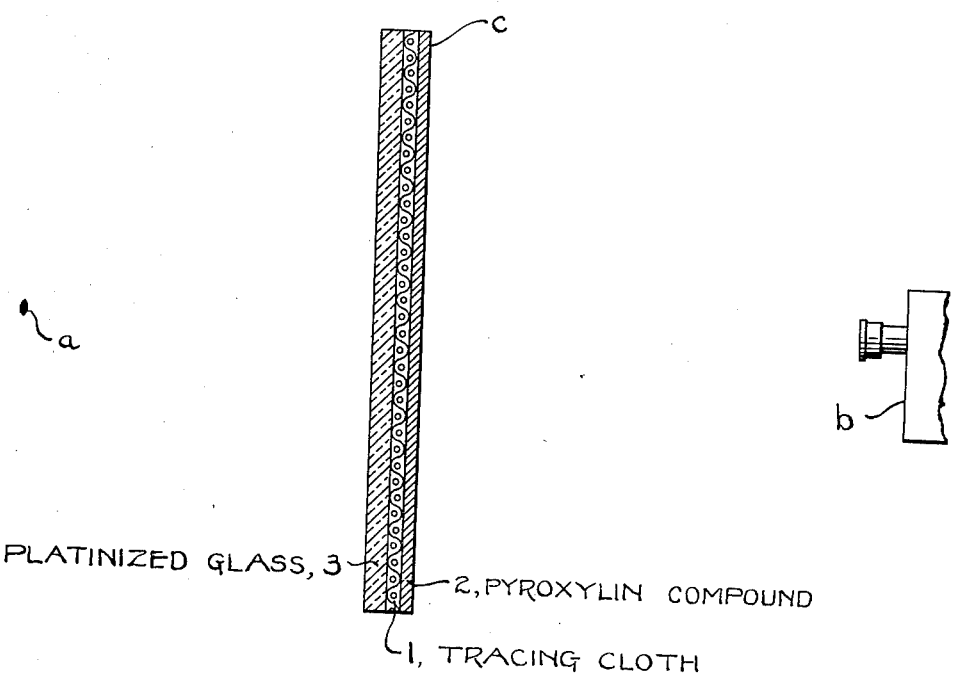
Austin Day Brixey INVENTOR
BY
Thomas Howe ATTORNEY Patented Apr. 14, 1925.

1,533,374

UNITED STATES PATENT OFFICE.

AUSTIN DAY BRIXEY, OF GREENWICH, CONNECTICUT, ASSIGNOR TO THE REPLITURA CORPORATION, A CORPORATION OF NEW YORK.

PROJECTED-LIGHT PICTURE SCREEN.

Application filed August 27, 1920, Serial No. 406,395. Renewed April 4, 1924.

*To all whom it may concern:*

Be it known that I, AUSTIN DAY BRIXEY, a citizen of the United States of America, residing at the city of Greenwich, county of Fairfield, and State of Connecticut, have invented new and useful Improvements in Projected-Light Picture Screens, of which the following is a specification.

This invention relates to means whereby a picture, image or design may be reproduced at a distance through the instrumentality of projected light, it being especially adapted for use in connection with magic lanterns, moving picture projectors, etc.

In the Patent No. 1,204,401 dated November 14th, 1916, is shown a device of this general character, the present invention having to do with screens of the transmission type as explained in the patent referred to.

The main object of the invention is to provide a picture screen of the character indicated which shall produce an unusually clear, soft and sharply defined picture.

A further object of the invention is to provide a screen of the character indicated which shall readily lend itself to processes of manufacture.

Other and ancillary objects of the invention will appear hereinafter.

In the accompanying drawing which illustrates the invention, the figure shows an improved screen in section in its relationship to the projector and the eye of the observer, the two last being conventionally shown and the thickness of the constituent parts of the screen being exaggerated over actual conditions for the sake of clearness.

Referring to the drawing the eye of the observer is indicated at $a$, the projector at $b$ and the picture visualizing device or screen at $c$. The projector may be of any suitable or well known construction.

The picture screen $c$ comprises a sheet 1 of tracing cloth. This tracing cloth may be that commonly in use by draftsmen which, as is well known, comprises a fabric woven of threads after the usual manner of weaving cloth to which is applied a composition which gives a smooth surface and yet is light transmitting to a sufficient extent to permit the draftsman to observe through the tracing cloth any objects beneath it. This need not be described in further detail as it is a product well known in the art. Upon one side of the tracing cloth is placed a coating 2 of a compound of pyroxylin which is compounded and applied in the following manner.

Amyl acetate _____ 55 parts by volume.
Wood alcohol, 97% ____ 25 parts by volume.
Pyroxylin _____ 14 parts by weight.
Zinc oxide, carbonate or
  sulphide _____ 13 parts by weight.
Camphor _____ 4 parts by weight.
Refined fusel oil _____ 10 parts by volume.
Benzine 62° _____ 20 parts by volume.

and to this should preferably be added a trace of methylene blue to produce a more perfect whiteness of the composition. The compound thus produced is then mixed half and half with a thinner of the following composition—

Thinner.
Amyl acetate _____ 40 oz.
Refined fusel oil _____ 6 oz.
Wood alcohol 97% _____ 35 oz.
Benzine 62° _____ 20 oz.
Benzine 71° _____ 27 oz.

The mixture thus secured is then flowed over a surface of the tracing cloth while it is maintained in a position of about 45° to the horizontal. The proper amount of the mixture will then adhere to the surface of the tracing cloth and produce the coating 2 shown in the figure, the coating having been allowed to harden after application. The screen may then be placed in position as shown in the drawing with the tracing cloth toward the eye of the observer when an unusually distinct and soft picture will be observed upon the operation of the projector. When the tracing cloth with its coating as described is used alone, it is preferable that the shiny side of the tracing cloth be the one to which the coating is applied so that the rougher side of the cloth will be toward the observer, the reflection from the surface of the device being thus lessened, and the distinctness of the picture improved, over what would be the case if the shiny side of the cloth were nearer the observer. However, if the coating were applied to the rough side of the cloth so that the shiny side of the tracing cloth were exposed, this shiny surface could be dulled in any suitable manner as by rubbing it with cornstarch or in any other suitable way. The reflection to the eye of the observer from the surface of the tracing cloth may be practically eliminated, and this is probably the most satisfactory method, by placing a plate 3 of platinized glass between the tracing cloth and the observer's eye. This platinized glass may be of the same character as described in my patent above referred to.

While the method just described gives very satisfactory results a small variation in the thickness of the coating from that referred to, which would be obtained if the tracing cloth were held at different angles from that mentioned in applying the coating, or which might vary therefrom when applied in other ways, would still permit the realization to a large extent of the advantages of the screen, it being intended to indicate that the precise thickness of the coating is not essential but may be varied to a considerable extent to suit different conditions.

While I do not desire to confine myself to any particular theory of operation, it is my understanding that the excellence of the screen is due to the peculiarly efficient action of the coating in diffusing the light and so producing the picture or image. This very property, however, causes the light to be refracted into sidewise rays which interfere with each other and tend to produce indistinctness. By placing the woven fabric in juxta-position to this medium, however, the threads of the fabric prevent this sidewise propagation of the light rays and confine them to a path from the surface of the coating which is substantially perpendicular to the surface of the screen upon the side of the observer's eye. The picture is thus made clear, distinct and definite and at the same time the improved properties of the coating are availed of so that the combination provides a means for producing an unusually distinct, soft and well defined picture.

While the invention has been illustrated in its best application it may have other embodiments without departing from its spirit and is not therefore limited to the precise details of the composition of matters cited nor to the structure shown in the drawing.

What I claim is:

1. A picture screen for projectors of the transmission type comprising a compound of amyl acetate, alcohol, pyroxylin, a white pigment, camphor, fusel oil and benzine as a light diffusing medium.

2. A picture screen for projectors of the transmission type comprising a pyroxylin compound and a tracing cloth through which light is successively transmitted.

3. A picture screen for projectors of the transmission type comprising a fabric coated with a compound of amyl acetate, alcohol, pyroxylin, a white pigment, camphor, fusel oil and benzine.

4. A picture screen for projectors of the transmission type comprising a fabric having a coating compounded of amyl acetate, alcohol, pyroxylin, a white pigment, camphor, fusel oil and benzine, and a reflection reducing medium through which the light successively passes.

5. A picture screen for projectors of the transmission type comprising a fabric having a coating compounded of amyl acetate, alcohol, pyroxylin, a white pigment, camphor, fusel oil and benzine, and platinized glass acting as a reflection reducing medium through which the light successively passes.

In testimony whereof I have signed this specification this 26th day of August 1920.

AUSTIN DAY BRIXEY.